(12) United States Patent
Dobosz et al.

(10) Patent No.: US 9,951,695 B2
(45) Date of Patent: Apr. 24, 2018

(54) MULTI-AXIS ACCESSORY GEARBOXES OF MECHANICAL DRIVE SYSTEMS AND GAS TURBINE ENGINES INCLUDING THE SAME

(71) Applicant: HONEYWELL INTERNATIONAL INC., Morristown, NJ (US)

(72) Inventors: Tomasz Dobosz, Tempe, AZ (US); Shawn Alstad, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1031 days.

(21) Appl. No.: 14/264,760

(22) Filed: Apr. 29, 2014

(65) Prior Publication Data

US 2015/0308350 A1 Oct. 29, 2015

(51) Int. Cl.
*F02C 7/32* (2006.01)
*F16H 1/22* (2006.01)
*B64D 41/00* (2006.01)

(52) U.S. Cl.
CPC .............. *F02C 7/32* (2013.01); *B64D 41/00* (2013.01); *F16H 1/222* (2013.01); *Y02T 50/44* (2013.01)

(58) Field of Classification Search
CPC . B64D 41/00; F02C 7/32; F16H 1/222; Y02T 50/44; F01D 5/12; F05D 2260/4031; F05D 2260/40311
USPC .................... 415/122.1; 60/802; 74/417, 423
See application file for complete search history.

(56) References Cited

U.S. PATENT DOCUMENTS

| | | | |
|---|---|---|---|
| 2,269,916 A | 1/1942 | Price | |
| 2,426,878 A | 9/1947 | Willgoos | |
| 2,620,622 A | 12/1952 | Lundberg | |
| 5,233,886 A | 8/1993 | Bossler, Jr. | |
| 5,807,202 A | 9/1998 | Sammataro | |
| 6,260,429 B1 | 7/2001 | Andrei | |
| 8,347,637 B2 | 1/2013 | Suciu et al. | |
| 8,439,631 B2 | 5/2013 | Bartolomeo et al. | |

(Continued)

FOREIGN PATENT DOCUMENTS

EP 2123883 A2 11/2009
EP 2455597 A2 5/2012

(Continued)

OTHER PUBLICATIONS

EP Extended Search Report for Application No. EP 15163588.5 dated Sep. 16, 2015.

(Continued)

*Primary Examiner* — Mark Laurenzi
*Assistant Examiner* — Paul Thiede
(74) *Attorney, Agent, or Firm* — Lorenz & Kopf, LLP (57) ABSTRACT

Gas turbine engines including multi-axis accessory gearboxes of mechanical drive systems are provided. The gearbox comprises a housing, a drive shaft, bevel pinion and drive shaft bevel gears, and a side bevel gear set operable to directly at least one side accessory device. Housing is disposed about a towershaft operatively coupled to main engine shaft and operable to rotate about a first axis. Drive shaft is skewed to main shaft and operable to rotate about a second axis that intersects the first axis at a first angle. Bevel pinion gear is mounted on the towershaft. Drive shaft bevel gear is mounted on the drive shaft. Side bevel gear set comprises an input gear meshing with one or more side bevel gears each having a side bevel gear axis at a second angle to the first axis and independently positionable relative to input gear. Second angle is independent of other angles.

12 Claims, 7 Drawing Sheets

(56) References Cited

U.S. PATENT DOCUMENTS

| | | |
|---|---|---|
| 8,490,410 B2 | 7/2013 | Suciu et al. |
| 2005/0211093 A1 | 9/2005 | Latulipe et al. |
| 2009/0290976 A1 | 11/2009 | Suciu et al. |
| 2012/0117981 A1 | 5/2012 | Suciu et al. |
| 2012/0308362 A1 | 12/2012 | Eleftheriou |
| 2012/0317991 A1 | 12/2012 | Frost et al. |
| 2013/0145774 A1 | 6/2013 | Duong et al. |
| 2013/0180262 A1 | 7/2013 | Duong |

FOREIGN PATENT DOCUMENTS

| | | |
|---|---|---|
| FR | 3006733 A1 | 12/2014 |
| FR | 3017660 A1 | 8/2015 |
| WO | 2014130239 A2 | 8/2014 |

OTHER PUBLICATIONS

EP Examination Report for Application No. 15163588.5-1754 dated Mar. 15, 2013.
Extended EP Search Report for Application No. 17151890.9-1754 dated Apr. 26, 2017.
EP Examination Report for Application No. 17151690.9-1754 dated Oct. 31, 2017.

MULTI-AXIS ACCESSORY GEARBOXES OF MECHANICAL DRIVE SYSTEMS AND GAS TURBINE ENGINES INCLUDING THE SAME

TECHNICAL FIELD

The present invention generally relates to aerospace propulsion systems, and more particularly relates to multi-axis accessory gearboxes of mechanical drive systems and gas turbine engines including the same.

BACKGROUND

Figure 1:
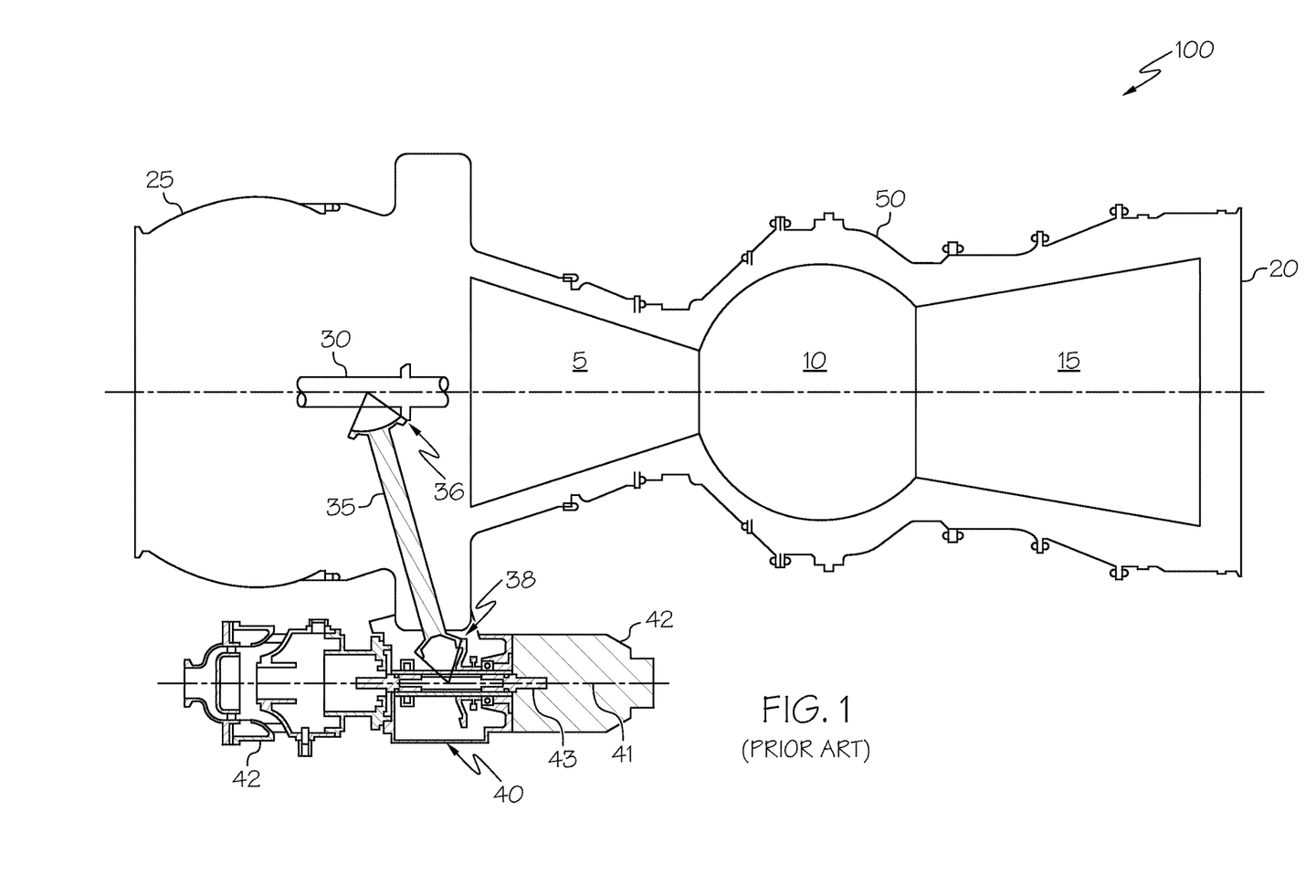
FIG. 1 is a left side cutaway view of a conventional gas turbine engine with a conventional accessory gearbox (AGB)

FIG. 1 depicts a left side cutaway view of a conventional gas turbine engine 100 including a conventional accessory gearbox (AGB) 40 mounted thereon. The conventional gas turbine engine 100 comprises an air inlet 25, a compressor section 5, a combustion section 10, and a turbine section 15, arranged sequentially in that order. All of these sections are generally cylindrical and oriented coaxially. The conventional gas turbine engine further comprises an exhaust plenum 20, and the AGB 40. The compressor 5, the turbine 15 and the AGB 40 are all coaxially coupled by the main engine shaft 30 (shown only in part in the interest of brevity and clarity). With the exception of the AGB 40, the entire engine is enclosed in an engine casing 50.

The accessory gearbox (AGB) 40 drives various accessory devices 42 essential for the engine and for aircraft operation. Such accessory devices 42 include, for example, tachometers, generators (alternators), hydraulic pumps, fuel pumps, oil pumps, fuel controls, starters, Permanent Magnet Generators (PMA), and (in some instances) water pumps, etc. Accessory devices may operate at different rotational speeds and powers. The accessory devices, the AGB 40 and the engine casing 50 (inclusive of the engine) must all fit with the confines of an aerodynamic nacelle or within an engine bay. A nacelle is a cover housing that is separate from the aircraft fuselage that holds engines, fuel, or equipment.

Figure 1A:
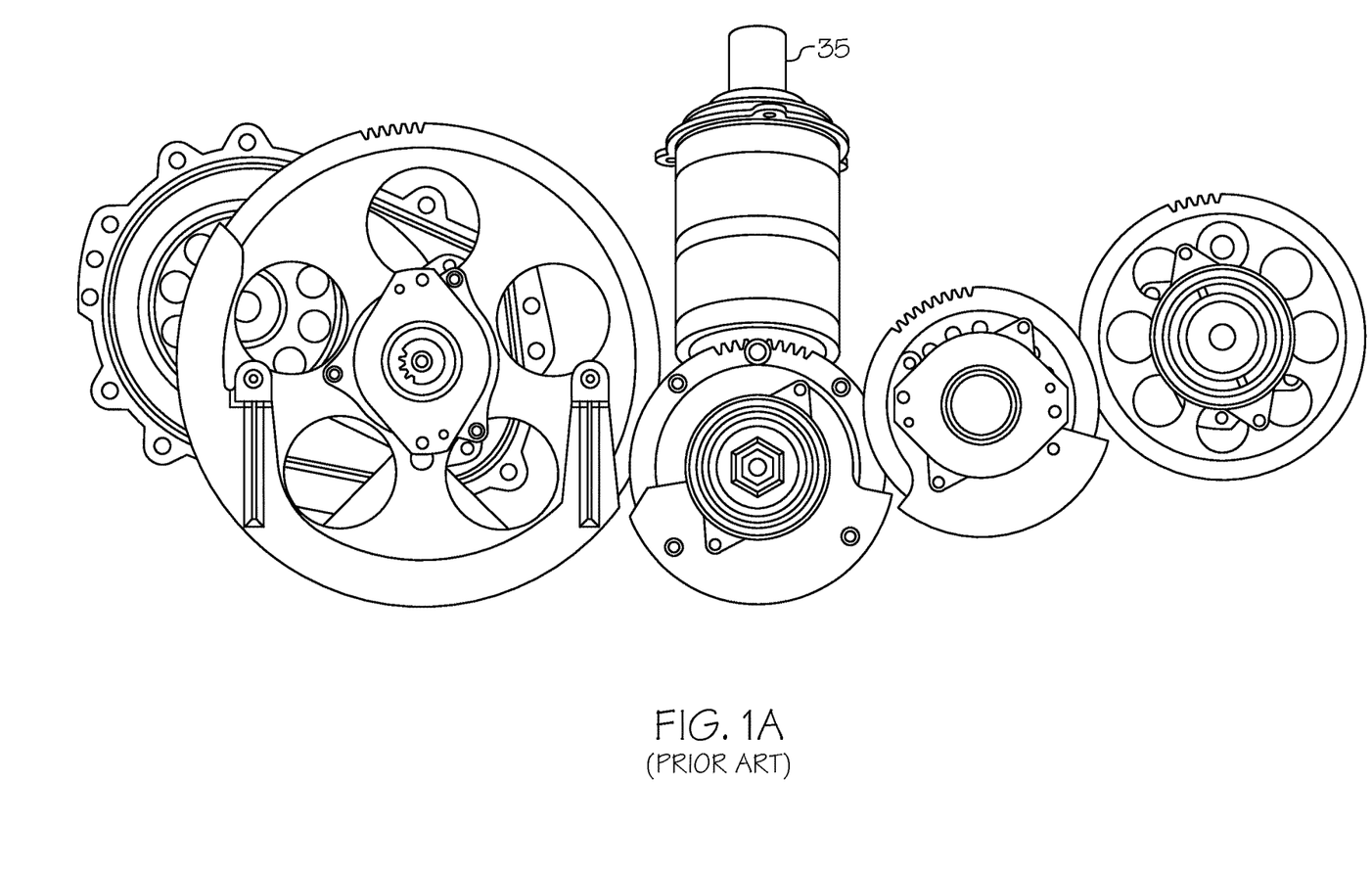
FIG. 1A is a disembodied view of a spur gear train of a conventional AGB driving a plurality of accessory devices.

A towershaft 35 driven by a first set of bevel gears 36 off of the main engine shaft 30 is typically used to transfer power from the main engine shaft 30 to the AGB 40. The conventional AGB has at least one gear axis 41 running in a plane parallel with the main engine shaft 30. More specifically, the towershaft transfers power from the main engine shaft 30 to a second set of bevel gears 38 mounted inside the AGB 40. Driven by the second set of bevel gears, generally parallel with the main engine axis 30 and either perpendicular or canted in relation to the towershaft, is an input drive shaft 43. Integral to this shaft is an accessory input spur gear that drives a spur gear train (see FIG. 1A) that supplies power to the plurality of accessory devices 42 installed on the AGB 40. Accessory devices may be mounted to the forward and aft faces of the conventional AGB (e.g., a pair of accessory devices 42 are depicted in FIG. 1, one of the accessory devices 42 depicted on the AGB forward face and the other accessory device of the pair of accessory devices depicted on the AGB aft face).

Each of the accessory devices 42 driven by the conventional AGB 40 are arranged in a direction parallel with the main shaft 30 and are dispersed arcuately around the engine casing 50 and locally radially away from the main engine shaft 30. This arrangement permits the accessory devices 42 to fit between a wall of an engine bay and the engine casing 50, but requires a large amount of space within the engine nacelle. In addition, the number of accessory devices, their rotational speed, and power required to turn, combined with the conventional AGB arrangement (whereby the second set of bevel gears are used in right angle configurations, and the towershaft and input drive shaft are arranged either perpendicular or at a canted angle to each other generally replicating the angle of the towershaft to the main engine shaft 30), can increase the size and weight of the AGB. With conventional AGBs, there are also concerns about the ease of access to the accessory devices and their installation/removal, and the layout of associated hoses and electrical connectors and accessory cooling, making the packaging of the accessory devices, the AGB, and the gas turbine engine within the engine nacelle a complicated task.

Accordingly, it is desirable to provide improved accessory gearboxes of mechanical drive systems and gas turbine engines including the same.

BRIEF SUMMARY

Multi-axis accessory gearboxes are provided. In accordance with one exemplary embodiment, the multi-axis accessory gearbox comprises a gearbox housing, a drive shaft, a bevel pinion gear, a drive shaft bevel gear, and a side bevel gear set. The gearbox housing is disposed about a towershaft operatively coupled to a main shaft of an aircraft gas turbine engine. The towershaft is operable to rotate about a first axis. The drive shaft is skewed to the main shaft and operable to rotate about a second axis that intersects the first axis at a first angle. The bevel pinion gear is mounted on the towershaft and the drive shaft bevel gear is mounted on the drive shaft. The side bevel gear set is operable to directly drive at least one side accessory device. The side bevel gear set comprises an input gear meshing with one or more side bevel gears. Each side bevel gear is independently positionable relative to the input gear and each has a side bevel gear axis at a second angle to the first axis, the second angle being the same between each side bevel gear axis and the first axis and independent of any other angle.

Gas turbine engines for aircraft are provided in accordance with yet another exemplary embodiment of the present invention. The gas turbine engine comprises a main shaft driven by a turbine rotor, a towershaft operatively coupled to the main shaft and operable to rotate about a first axis, and a multi-axis accessory gearbox. The multi-axis accessory gearbox comprises a gearbox housing disposed about the towershaft. The towershaft transmits power from the gas turbine engine to a plurality of accessory devices configured to be mounted about the multi-axis accessory gearbox. The multi-axis accessory gearbox further comprises a drive shaft, a bevel pinion gear, a drive shaft bevel gear, and a side bevel gear set. The drive shaft is skewed to the main shaft and operable to rotate about a second axis that intersects the first axis at a first angle. The bevel pinion gear is mounted on the towershaft. The drive shaft bevel gear is mounted on the drive shaft. The side bevel gear set is operable to directly drive at least one side accessory device. The side bevel gear set comprises an input gear meshing with one or more side bevel gears. Each side bevel gear is independently positionable relative to the input gear and each has a side bevel gear axis at a second angle to the first axis, the second angle being the same between each side bevel gear axis and the first axis and positionable independently of any other angle.

Mechanical drive systems of aircraft gas turbine engines are also provided in accordance with yet another exemplary embodiment of the present invention. The mechanical drive system comprises a towershaft and a multi-axis accessory gearbox disposed about a portion of the towershaft. The towershaft is operable to rotate about a first axis and is operatively coupled to a main shaft of the aircraft gas turbine engine. The multi-axis accessory gearbox further comprises a drive shaft, a bevel pinion gear, a drive shaft bevel gear, and a side bevel gear set. The drive shaft is operable to rotate about a second axis that intersects the first axis at a first angle. The bevel pinion gear is mounted on the towershaft. The drive shaft bevel gear is mounted on the drive shaft. The side bevel gear set is operable to directly drive at least one side accessory device. The side bevel gear set comprises an input gear meshing with one or more side bevel gears each having a side bevel gear axis at a second angle to the first axis. Each side bevel gear is independently positionable relative to the input gear. The second angle is the same between each side bevel gear axis and the first axis and independently positionable of any other angle.

Furthermore, other desirable features and characteristics of the accessory gearbox and gas turbine engines including the same for mechanical drive systems will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 4A through 9B are schematic disembodied views of alternative gearing arrangements (i.e., mechanical drive systems) of the multi-axis AGB of FIGS. 2 and 3 (a gearbox housing omitted for ease of illustration) according to exemplary embodiments of the present invention.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to multi-axis accessory gearboxes (AGB) of mechanical drive systems and gas turbine engines including the same. The multi-axis AGB is configured to be more compact and lightweight relative to conventional AGBs, and thus able to be positioned closer to an engine casing while retaining the AGB load carrying capacity, thereby easing packaging of and access to the accessory devices mounted thereto, the multi-axis AGB, and the engine within the engine nacelle. As used herein, the term "gear set" means two or more meshed gears rotating together at specified gear ratios. The purpose of a gear set is to transfer rotational motion and torque at a known ratio from one driveline axis to another.

Figure 2:
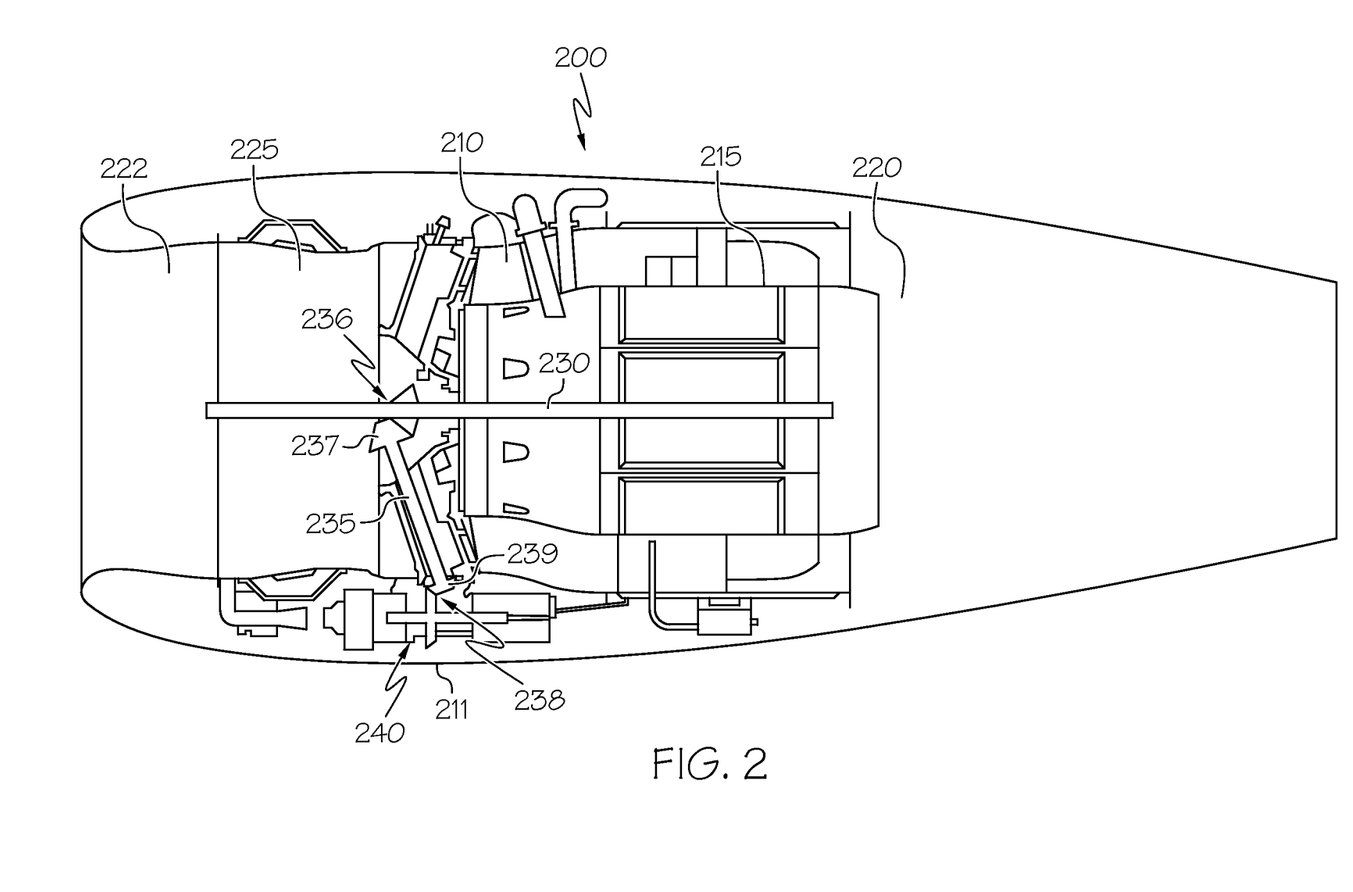
FIG. 2 is a cross-sectional view of an exemplary gas turbine engine with a multi-axis AGB secured thereto, according to exemplary embodiments of the present invention.
Figure 3:
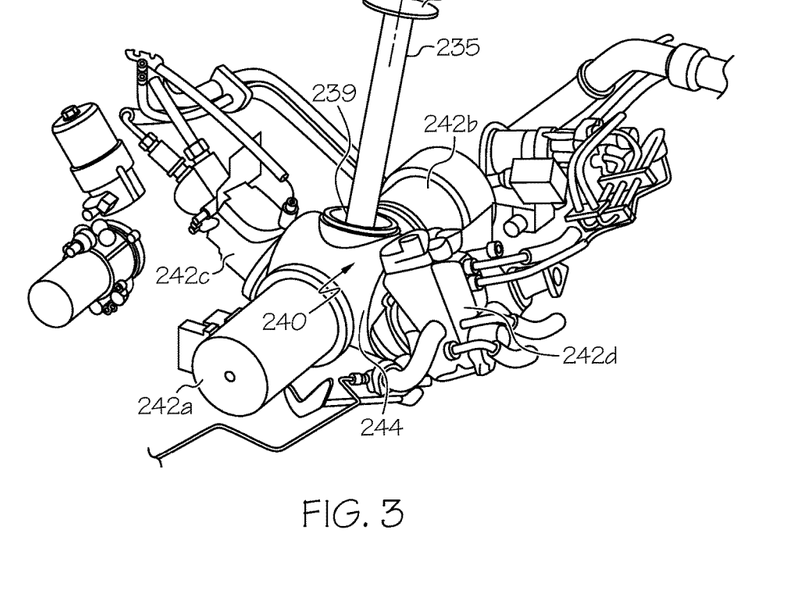
FIG. 3 is a perspective view of an exemplary mechanical drive system of the gas turbine engine of FIG. 2 comprising the towershaft and multi-axis accessory gearbox (AGB) according to exemplary embodiments of the present invention, the multi-axis AGB having four exemplary accessory devices (a starter, a hydromechanical unit (HMU), a generator, and a hydraulic pump) mounted thereon.

Referring now to FIGS. 2 through 3, according to exemplary embodiments of the present invention, a simplified cross sectional side view of a gas turbine engine 200 and an exemplary multi-axis AGB 240 mounted thereon according to exemplary embodiments are depicted. The gas turbine engine 200 includes an air inlet 222, a compressor section 225, a combustion section 210, a turbine 215, an exhaust plenum 220 and the multi-axis AGB 240. The compressor section 225, the combustion section 210, the turbine 215 and the multi-axis AGB 240 are all coaxially coupled by a main engine shaft 230. A first set of bevel gears 236 is utilized to take power from the main engine shaft 230 to a towershaft 235. The towershaft 235 has a first end 237 and a second end 239 and is operable to rotate about a first axis A (see, e.g., FIGS. 4A through 9B) at a first rotational speed. The first end is operatively coupled to the main engine shaft 230 via the first set of bevel gears 236 and the second end 239 is connected to a bevel gear train 246 (e.g., FIG. 4A) (a second bevel gear set 238 (FIG. 2)) enclosed within a gearbox housing 244 (FIG. 3) of the multi-axis AGB 240 as hereinafter described. The term "bevel gear train" as used herein means a set of two or more interconnected bevel gears. The teeth on the interconnected bevel gears of the bevel gear train are not shown for ease of illustration, but may be straight, spiral or hypoid as known in the art. The second end 239 of the towershaft 235 is connected to the bevel gear train 246 to drive a drive shaft 247 having a second axis that is skewed to the main engine axis 230, i.e., the second axis does not intersect and is not in the same plane as the main engine axis 230. Thus, the towershaft driven by the first set of bevel gears 236 off of the main engine shaft 230 is used to transfer power from the main engine shaft 230 to the bevel gear train to drive the drive shaft 247 including drive shaft accessory devices as hereinafter described. The drive shaft 247 is operable to rotate about a second axis B (see, e.g., FIGS. 4A through 9B) at a second rotational speed. The second axis B intersects the first axis at a first angle. The first axis of the towershaft 235 and the second axis of the drive shaft 247 may be 90 degrees apart or intersect at a first angle other than 90°. The towershaft 235 and the multi-axis AGB 240 together define a mechanical drive system 300 (FIGS. 4A through 9B) for transferring engine power from the gas turbine engine 200 to "directly" drive a plurality of accessory devices 242 (e.g., accessory devices 242a-242d of FIG. 3) mounted about the multi-axis AGB, as hereinafter described. As used herein, the term "directly" refers to the absence of a spur gear train conventionally used to drive the plurality of accessories. The plurality of accessory devices 242 comprises the drive shaft accessory devices ("one or two drive shaft accessory devices") and at least one side accessory device. The drive shaft accessory devices (exemplified by a generator 242a and a starter 242b in FIG. 3) are mounted at respective ends of the drive shaft 247 at the forward and aft faces of the gearbox housing while the side accessory devices are mounted at an end of each shaft 214 at the side faces of the gearbox housing 244. For example, referring again to FIG. 3, the exemplary generator 242a and starter 242b are depicted as drive shaft accessory devices and the depicted hydraulic pump and HMU 242c and 242d are depicted as side accessory devices. However, it is to be understood that depending on the gear ratios as known in the art, the high-speed accessory devices (such as the exemplary generator and starter) may be side accessory devices and the low-speed accessory devices may be drive shaft accessory devices, as hereinafter described.

As noted previously, the accessory devices 242 mounted about the multi-axis accessory gearbox are essential for the engine and for aircraft operation. The accessory devices may include, for example, tachometers, generators (alternators), hydraulic pumps, fuel pumps, oil pumps, fuel controls, starters, Permanent Magnet Generators (PMAs), and (in some instances) water pumps, etc. FIG. 3 depicts an exemplary generator 242a, an exemplary starter 242b, an exemplary hydraulic pump 242c, and an exemplary HMU 242d according to exemplary embodiments. The multi-axis AGB 240 provides the accessory devices 242 with the required torque and rotational speed. Each of the accessory devices may require a different rotational speed. For example, the exemplary generator 242a requires a rotational speed of, for example, 18000 RPM. This is a relatively high rotational speed relative to, for example, the 8000 RPM required by the hydraulic pump 242c and the 8000 RPM required by the HMU 242d. Thus, for example, starters, generators, PMA (Permanent Magnet Generators) may be considered high-speed accessory devices as each requires an 18000 RPM or greater and hydraulic pumps, oil pumps, and HMUs may be considered low-speed accessory devices as each requires a rotational speed of 8000 RPM or less. While FIG. 3 (and FIGS. 5A through 9B as hereinafter described) depicts the high-speed accessory devices (such as the generator and starter) as mounted on the drive shaft 247 and the low-speed accessory devices as mounted on shafts 214 and driven by side bevel gear sets as hereinafter described, it is to be understood that in the depicted embodiments of FIGS. 4A and 4B, the drive shaft 247 is the lower rotational speed shaft driving the low-speed accessory devices and the side bevel gear sets drive the high-speed accessory devices.

Still referring to FIG. 3, and now to FIGS. 4A through 9B, according to exemplary embodiments of the present invention, the multi-axis AGB 240 comprises the gearbox housing 244, the drive shaft 247, a bevel pinion gear 248a (hereinafter a "first bevel pinion gear") and optionally, 248b (hereinafter an optional "second bevel pinion gear") mounted on the second end 239 of the towershaft, a drive shaft bevel gear 250 mounted on the drive shaft 247, and a side bevel gear set 256 operable to directly drive at least one side accessory device. In some embodiments (as depicted in FIGS. 8A through 9B), the multi-axis AGB 240 further comprises a drive shaft bevel pinion gear 251 as hereinafter described. The gearbox housing 244 (FIG. 3) may be secured to the outside bottom or side of the engine and corresponds to the location at which the mechanically-driven accessory devices 242 are mounted. The multi-axis AGB 240 may alternatively be secured to the outside top of the engine. The gearbox housing 244 may be a machined casting (investment, sand) or the like. The gearbox housing 244 is disposed centrally about the towershaft 235 and has a plurality of openings in a wall thereof for mounting the mechanically-driven accessories. The accessory devices protrude radially outwardly from the gearbox housing 244 as depicted in FIG. 3.

A bevel pinion gear axis C of bevel pinion gear 248a and optional 248b is the same as first axis A. The drive shaft bevel gear 250 has a drive shaft bevel gear axis D that is the same as second axis B. As noted previously, the first axis A and the second axis B may be 90 degrees apart (a "first angle") or intersect at varying first angles other than 90°. Thus, the bevel pinion gear axis C and the drive shaft bevel gear axis D may be at 90° apart or other than 90° apart.

The side bevel gear set 256 comprises an input gear meshing with one or more side bevel gears (such as depicted side bevel gears 252a and 252b) each having a side bevel gear axis (E and F in the depicted embodiments) that is at a second angle to the first axis. For example, the second angle between side bevel gear axis E and the first axis is the same as the second angle between side bevel gear axis F and the first axis. As the plurality of side bevel gears 252 are each symmetrical with each other, the second angle is the same for each side bevel gear relative to the first axis. Each side bevel gear is independently positionable relative to the input gear, as long as the same second angle is maintained between each side bevel gear axis relative to the first axis. In this regard, the terms "roll" and "rolling" as used herein refers to the positioning of each side bevel gear 252 around the input gear independently of each other. The second angle is independently positionable of any other angle. Each of the side bevel gears is mounted on a shaft 214. The input gear of the side bevel gear set 256 may comprise the drive shaft bevel gear 250 (FIGS. 4A and 4B), the first bevel pinion 248a (FIGS. 5A and 5B and FIGS. 7A through 7B), the second bevel pinion 248b (FIGS. 6A and 6B), or the drive shaft bevel pinion 251 (FIGS. 8A through 9B) as hereinafter described in more detail. Thus, the side bevel gears are each in a different plane than the first plane defined by the towershaft. The axes of the side bevel gears in both the horizontal and vertical planes relative to the drive shaft may be optimized.

In the depicted embodiments of FIGS. 4A/4B, 5A/5B, 6A/6B, 8A/8B, and 9A/9B, the side bevel gear axes E (hereinafter "a first side bevel gear axis") and F (a "second side bevel gear axis") of side bevel gears 252a and 252b are angled on each side of the towershaft defining a V-shaped configuration. When the side bevel gear axes are arranged relative to the towershaft at angles less than 90 degrees (such as in the V-shaped configuration), the overall height and profile of the accessory gearbox is decreased. In addition, the angular adjustability of the side accessory devices (because the second angle is independent of other angles in the mechanical drive system and because each side bevel may be independently positionable relative to the input gear) radially around the multi-axis AGB permits improved accessory placement and accessibility relative to the engine and AGB, thereby also improving accessory, AGB, and gas turbine engine packaging within the engine nacelle. The plurality of side accessory devices may be mounted to match the engine tangent. Thus, the first and second angles of the multi-axis AGB 240 may be varied so that the accessory devices may be aggregated together more compactly in the multi-axis AGB 240, i.e., the first and second angles are adaptively selected for selective placement of the the at least one side accessory device about the multi-axis AGB. In addition, the lower fan cowl door 211 (FIG. 2) in the engine nacelle may be lofted closer to the gas turbine engine, reducing engine drag, and thus improving the specific fuel consumption (SFC) of the engine/aircraft. The multi-axis accessory gearbox according to exemplary embodiments of the present invention allows the flexibility with each engine design to accommodate accessory devices that may be strategically swept and tangentially aligned with the engine. Once this optimized accessory device layout has been established, the lower half of the nacelle loft may be pulled inboard toward the engine centerline, resulting in an overall decrease in the air inlet, the lower fan cowl door, and even the thrust reverser or inert nozzle sizes. Smaller sizes mean less material, generally lower cost, lower weight, and a decrease in the frontal area of the gas turbine engine. This decrease in the frontal area reduces drag, thereby improving SFC. Improved SFC means the aircraft can fly higher, faster, and farther given the same amount of fuel. This is a positive step toward higher engine efficiency, reduced noise, and reductions in engine pollutants because the engine does not have to work as hard to overcome the extra weight and drag losses as a result of using conventional accessory gearboxes.

Figure 4A:
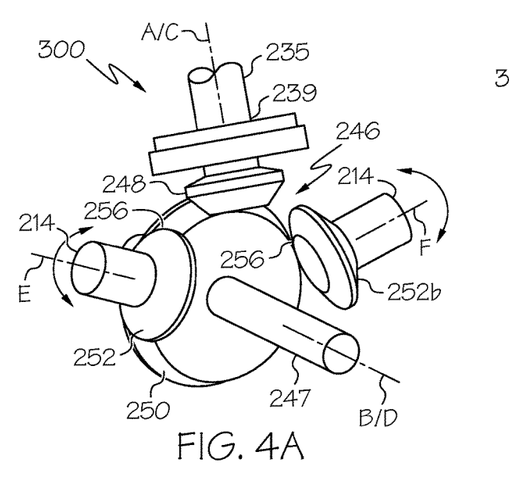
Figure 4B:
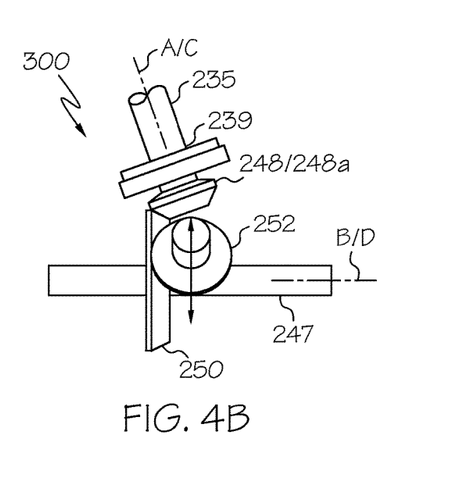

Referring now specifically to FIGS. 4A and 4B, in accordance with an exemplary embodiment of the present invention, the bevel pinion 248a on the towershaft meshes with the drive shaft bevel gear 250 to directly drive one or two drive shaft accessory devices (accessory devices not shown in FIGS. 4a and 4b) and the drive shaft bevel gear 250, as the input gear, in turn, meshes with side bevel gears 252a and 252b This interconnecting arrangement of gears defines exemplary gear train 246 of FIG. 4A to drive two side accessory devices, i.e., the power from the drive shaft bevel gear 250 is transferred to the side bevel gears 252a and 252b. The side bevel gears are attached to shafts 214. The bevel pinion gear 248a on the towershaft has the same number of teeth, diametral pitch, and geometry as each of the side bevel gears 252a and 252b (as noted previously, the teeth of each of the gears are not shown for ease of illustration). The side bevel gears 252a and 252b roll on the drive shaft bevel gear 250 as shown by the arrows in FIGS. 4A and B. Side bevel gear 252a can roll independently of side bevel gear 252b.

Figure 5A:
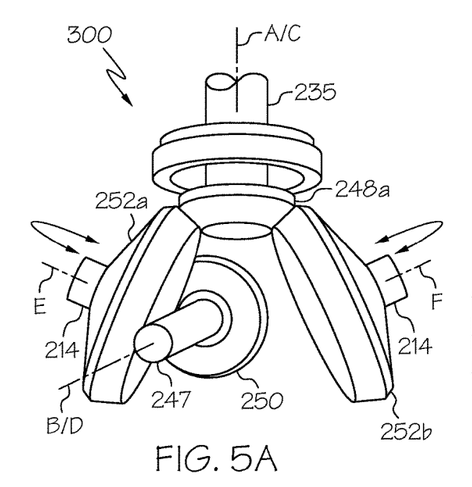
Figure 5B:
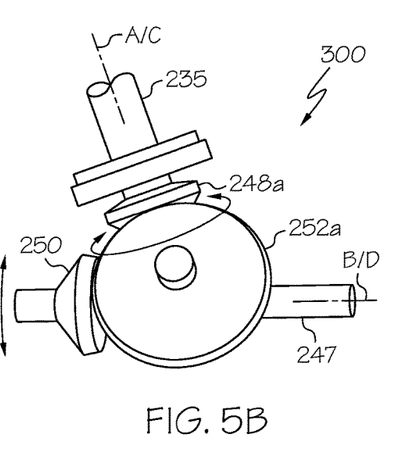

Referring now specifically to FIGS. 5A and 5B, in accordance with another exemplary embodiment of the present invention, the towershaft 235 transfers power from the main engine shaft 230 (FIG. 2) to the bevel pinion gear 248a. The bevel pinion gear 248a on the towershaft meshes with side bevel gears 252a and 252b that, in turn, mesh with the drive shaft bevel gear 250 to drive the one or two drive shaft accessory devices, i.e., the towershaft transfers power from the main engine shaft 230 to the bevel pinion gear 248a. The bevel pinion gear 248a transfers power to the side bevel gears 252a and 252b to drive the at least one side accessory device. From one or both side bevel gears, power is transferred to the drive shaft bevel gear 250 that is mounted on drive shaft 247 to directly drive the one or two drive shaft accessories. As noted previously, a drive shaft accessory device may be attached to both ends of the drive shaft 247 (thus, the "one or two drive shaft accessories"). The bevel pinion 248a on the towershaft 235 has the same number of teeth, diametral pitch, and geometry as the drive shaft bevel gear 250. Side bevel gear 252a has the same number of teeth (not shown) as side bevel gear 252b. The second angle is defined in a plane containing both the bevel pinion axis C and the side bevel gear axis E. The second angle between the first axis (and the bevel pinion axis C of first bevel pinion 248a) and side bevel gear axis E of side bevel gear 252a is the same as the second angle between the first axis (and bevel pinion axis C of first bevel pinion 248a) and side bevel gear axis F of side bevel gear 252b. The side bevel gears 252a and 252b roll on the bevel pinion gear 248a, as indicated by the arrows in FIGS. 5A and 5B. As noted previously, the terms "roll" and "rolling" as used herein refer to the positioning of the side bevel gears around the input gear (in this case, the bevel pinion gear 248a (radially)) independently of each other. While drive shaft bevel gear 250 is depicted as rolling on the side bevel gear 252a, it is to be understood that drive shaft bevel gear 250 may alternatively roll on side bevel gear 252b. The drive shaft bevel gear axis D is at a third angle to each of the side bevel gear axes. The third angle is the same as the second angle between the first axis and the side bevel gear axes, in the depicted embodiments of FIGS. 5A and 5B, but the second angle remains independent from any other angle including the third angle, i.e., the second angle may be selected without regard to the third angle or any other angle but the third angle must then be the same as the second angle. The drive shaft bevel gear axis D is at a fourth angle to the first axis. While bevel gears are depicted in FIGS. 5A and 5B, it is to be understood that hypoid gears as known in the art may be used.

Figure 6A:
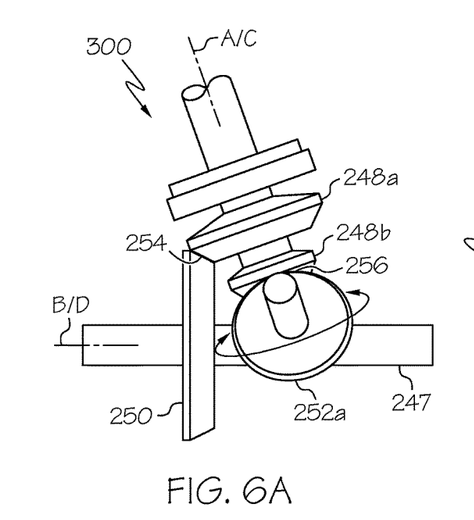
Figure 6B:
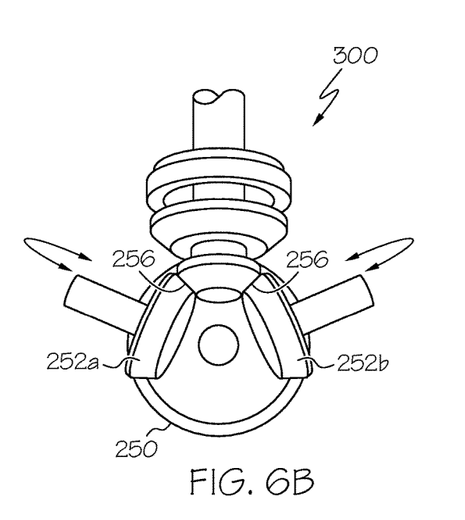
Figure 7A:
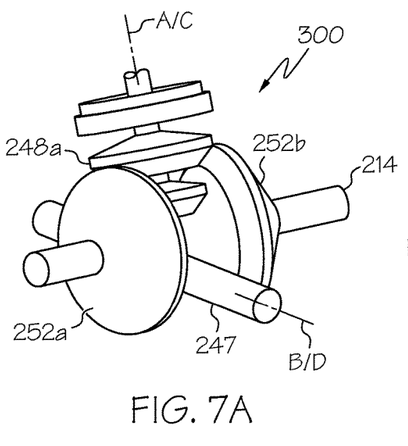
Figure 7B:
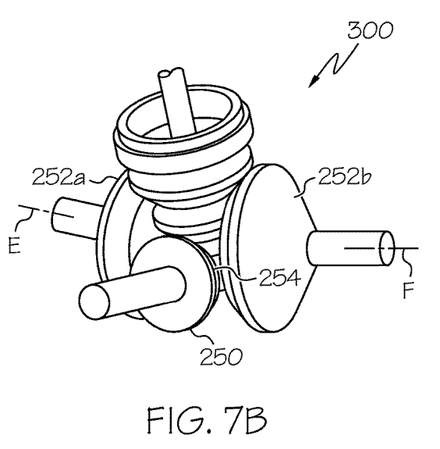
Figure 8A:
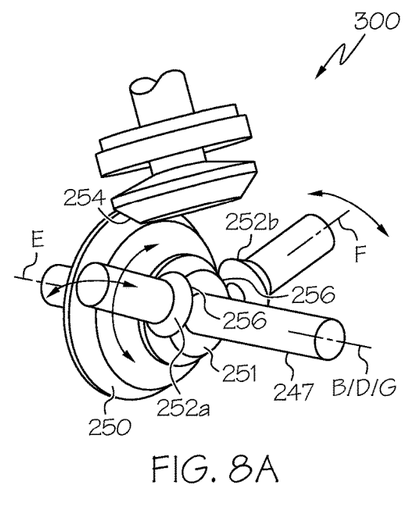
Figure 8B:
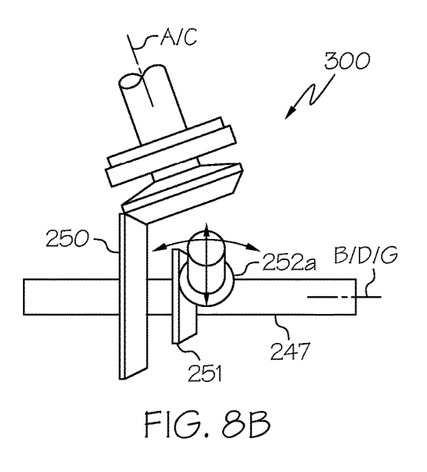
Figure 9A:
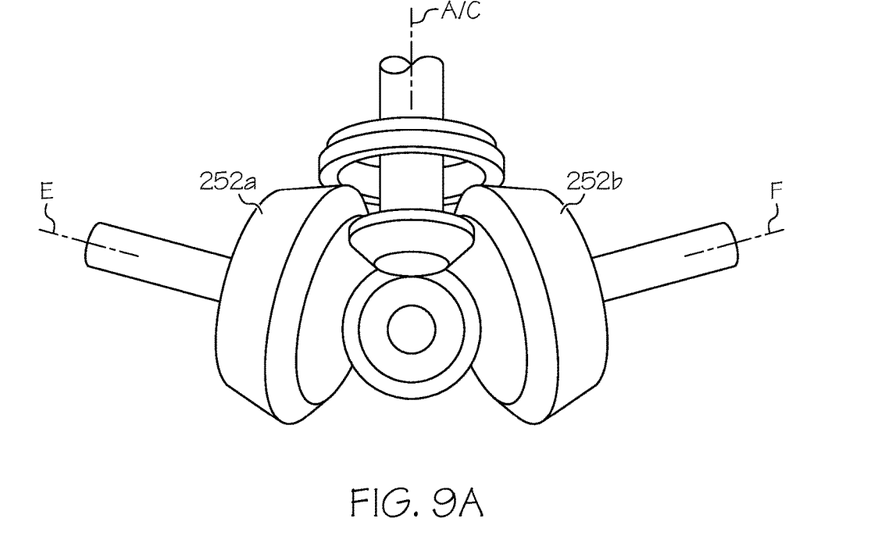
Figure 9B:
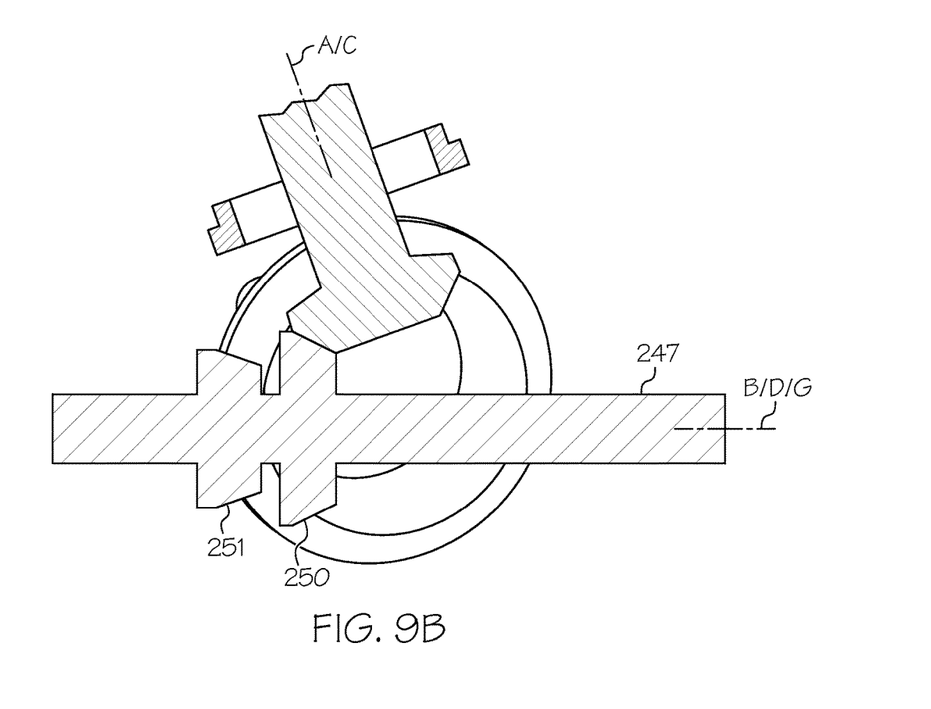

Referring now to FIGS. 6A and 6B, in accordance with another exemplary embodiment of the present invention, the first bevel pinion 248a meshes with the drive shaft bevel gear 250 to directly drive the one or two drive shaft accessory devices. The second bevel pinion 248b (the "input gear" in the exemplary embodiments depicted in FIGS. 6A and 6B) meshes with each side bevel gear 252a and 252b to drive the at least one side accessory device. In FIGS. 7A and 7B, in accordance with another exemplary embodiment of the present invention, the first bevel pinion 248a (the "input gear" in FIGS. 7A and 7B) meshes with the side bevel gears 252a and 252b to drive the side accessory devices and the second bevel pinion 248b meshes with the drive shaft bevel gear 250 to drive the one or two drive shaft accessory devices. As noted previously, side bevel gears 252a and 252b of each of FIGS. 6A/6B and 7A/7B may be radially positioned around the input gear (the second bevel pinion 248b in FIGS. 6A/6B and the first bevel pinion 248a in FIGS. 7A/7B) independently of each other.

In FIGS. 8A through 9B, in accordance with another exemplary embodiment of the present invention, the bevel pinion 248a on the towershaft meshes with the drive shaft bevel gear 250 to drive the one or two draft shaft accessory devices. Drive shaft 247 also includes the drive shaft bevel pinion 251 mounted thereon. Drive shaft bevel pinion 251 meshes with side bevel gears 252a and 252b to drive the at least one side accessory device. The drive shaft bevel pinion 251 has a drive shaft bevel pinion axis G that is the same as the second axis B and drive shaft bevel gear axis D. Thus, the drive shaft bevel pinion axis is at the third angle to each side bevel gear axis. The drive shaft bevel gear axis D is at a fourth angle to the first axis A. The fourth angle is independent of the third angle and is 90° or other than 90°. The angle between the bevel pinion axis C of bevel pinion gear 248a and the drive shaft bevel gear axis D of drive shaft bevel gear 250 can be 90°, or greater or less than 90°. This angle is the same as the first angle between the first axis A and the drive shaft bevel gear axis D. The angle is defined in a plane containing both axes of the bevel pinion gear 248a and the drive shaft bevel gear 250. The third angle between drive shaft bevel pinion gear 251 and each of the side bevel gears 252a and 252b is the same. The side bevel gears 252a and 252b have the same number of teeth. The side bevel gears 252a and 252b roll on the drive shaft bevel pinion 251. Side bevel gear 252a may be positioned radially around drive shaft bevel pinion 251 independently of side bevel gear 252b. Therefore, the driven drive shaft bevel gear 250 (driven by the bevel pinion gear 248a) and the driver drive shaft bevel pinion gear (driver for the side bevel gears 252a and 252b) are mounted on the same shaft (the drive shaft 247). It is to be understood that there may be more than one drive shaft bevel pinion and more than the two ("one or more") depicted side bevel gears to drive multiple side accessory devices.

In general, while two side bevel gears and two side accessory devices have been described and depicted (e.g., FIG. 3), it is to be understood that there may be one or more side bevel gears and driven side accessory device. The number of side bevel gears corresponds to the number of side accessory devices. The number of side bevel gears and driven side accessory devices depend upon the available envelope size within the engine nacelle and the size of the bevel pinion gear (s). As the bevel pinion gear size increases, the number of side bevel gears that may be arranged circumferentially about the towershaft at the second angle may increase with the number of side accessory devices also increasing, as long as space in the engine nacelle permits.

All components of the proposed invention can be fabricated utilizing well-known manufacturing methods for metal fabrication including: gear generation by shaping, hobbing and gear grinding. Generally, 9310 material per AMS6265 is used for the pinion and bevel gears but a variety of materials available can be utilized. Well established heat treat methods are used to harden the gears (nitriding, carburizing) to achieve proper tooth surface properties. Standard ball bearings are to be utilized for the present invention that are chosen based on the loads carried by the gearbox utilizing best known bearing design practice. The same principle applies to the bevel gears enclosed within the multi-axis AGB.

From the foregoing, it is to be appreciated that the multi-axis accessory gearboxes for mechanical drive systems and aircraft gas turbine engines including the same provide flexibility in accessory device placement relative to the gas turbine engine and AGB, making the accessory devices, AGB, and gas turbine engine easier to package within the confines of the engine nacelle. The compact multi-axis accessory gearbox uses exclusively bevel gears to directly drive the accessory devices, rather than using spur gears that conventionally drive the accessory devices. Eliminating the use of a spur gear train results in a smaller, more compact and lightweight AGB. Moreover, that the multiple axes in the multi-axis AGB may be angularly adjusted lowers the multi-axis AGB profile relative to conventional accessory gearboxes.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-axis accessory gearbox comprising:
  a gearbox housing disposed about a towershaft operatively coupled to a main shaft of an aircraft gas turbine engine and operable to rotate about a first axis;
  a drive shaft skewed to the main shaft and operable to rotate about a second axis that intersects the first axis at a first angle;
  a bevel pinion gear mounted on the towershaft;
  a drive shaft bevel gear mounted on the drive shaft; and
  a side bevel gear set operable to directly drive at least one side accessory device, the side bevel gear set comprising one or more side bevel gears, each side bevel gear being independently positionable relative to the drive shaft bevel gear and each having a side bevel gear axis at a second angle to the first axis, the second angle being the same between each side bevel gear axis and the first axis,
  wherein the bevel pinion gear directly drives the drive shaft bevel gear to directly drive one or two drive shaft accessories and the drive shaft bevel gear drives the one or more side bevel gears, and the drive shaft bevel gear has a drive shaft bevel gear axis that is at a third angle to each of the side bevel axes.

2. The multi-axis accessory gearbox of claim 1, wherein the side bevel gear axis of one of the one or more side bevel gears comprises a first side bevel gear axis and the side bevel gear axis of another one of the one or more side bevel gears comprises a second side bevel gear axis, and the first and second bevel gear axes define a V-shaped configuration.

3. The multi-axis accessory gearbox of claim 1, wherein the bevel pinion gear has the same number of teeth, diametral pitch, and geometry as each side bevel gear.

4. The multi-axis accessory gearbox of claim 1, wherein the drive shaft further comprises a second drive shaft bevel pinion gear that meshes with the one or more side bevel gears.

5. The multi-axis accessory gearbox of claim 4, wherein the drive shaft bevel gear has a drive shaft bevel gear axis at a fourth angle to the first axis, the fourth angle being independent of the third angle.

6. A gas turbine engine for an aircraft comprising:
  a main shaft driven by a turbine rotor;
  a towershaft operatively coupled to the main shaft and operable to rotate about a first axis;
  a multi-axis accessory gearbox comprising a gearbox housing disposed about the towershaft for transmitting power from the gas turbine engine to a plurality of accessory devices configured to be mounted about the multi-axis accessory gearbox, the multi-axis accessory gearbox further comprising:
    a drive shaft skewed to the main shaft and operable to rotate about a second axis that intersects the first axis at a first angle;
    a bevel pinion gear mounted on the towershaft;
    a drive shaft bevel gear mounted on the drive shaft; and a side bevel gear set operable to directly drive the at least one side accessory device of the plurality of accessory devices, the side bevel gear set comprising one or more side bevel gears, each side bevel gear being independently positionable relative to the drive shaft bevel gear and each having a side bevel gear axis at a second angle to the first axis, the second angle being the same between each side bevel gear axis and the first axis, wherein the bevel pinion gear drives the drive shaft bevel gear to directly drive one or two drive shaft accessories of the plurality of accessory devices and the drive shaft bevel gear drives the one or more side bevel gears, the bevel pinion gear having the same number of teeth, diametral pitch, and geometry as each side bevel gear and the drive shaft bevel gear has a drive shaft bevel gear axis that is at a third angle to each of the side bevel axes.

7. The gas turbine engine of claim 6, wherein the bevel pinion gear meshes with the drive shaft bevel gear to directly drive one or two drive shaft accessory devices of the plurality of accessory devices, the drive shaft further comprising a second drive shaft bevel pinion gear that meshes with the one or more side bevel gears.

8. The gas turbine engine of claim 7, wherein the drive shaft bevel gear has a drive shaft bevel gear axis at a fourth angle to the first axis, the fourth angle being independent of the third angle.

9. A mechanical drive system of an aircraft gas turbine engine comprising:

a towershaft operable to rotate about a first axis and operatively coupled to a main shaft of the aircraft gas turbine engine;

a multi-axis accessory gearbox comprising a gearbox housing disposed about a portion of the towershaft, the multi-axis accessory gearbox further comprising:
  a drive shaft operable to rotate about a second axis that intersects the first axis at a first angle;
  a bevel pinion gear mounted on the towershaft;
  a drive shaft bevel gear mounted on the drive shaft; and
  a side bevel gear set operable to directly drive at least one side accessory device, the side bevel gear set comprising one or more side bevel gears each having a side bevel gear axis at a second angle to the first axis, each side bevel gear being independently positionable relative to the bevel pinion gear, the second angle being the same between each side bevel gear axis and the first axis,
  wherein the bevel pinion gear directly meshes with the one or more side bevel gears and the one or more side bevel gears directly mesh with the drive shaft bevel gear to directly drive one or two drive shaft accessories.

10. The mechanical drive system of claim 9, wherein the bevel pinion gear has the same number of teeth, diametral pitch, and geometry as the drive shaft bevel gear.

11. The mechanical drive system of claim 10, wherein the drive shaft bevel gear has a drive shaft bevel gear axis that is at a third angle to each of the side bevel gear axes.

12. The mechanical drive system of claim 11, wherein the drive shaft bevel gear axis is at a fourth angle to the first axis.

* * * * *